Sept. 17, 1940.  W. V. THELANDER  2,214,780
FRICTION CLUTCH
Filed Oct. 24, 1938  2 Sheets-Sheet 1
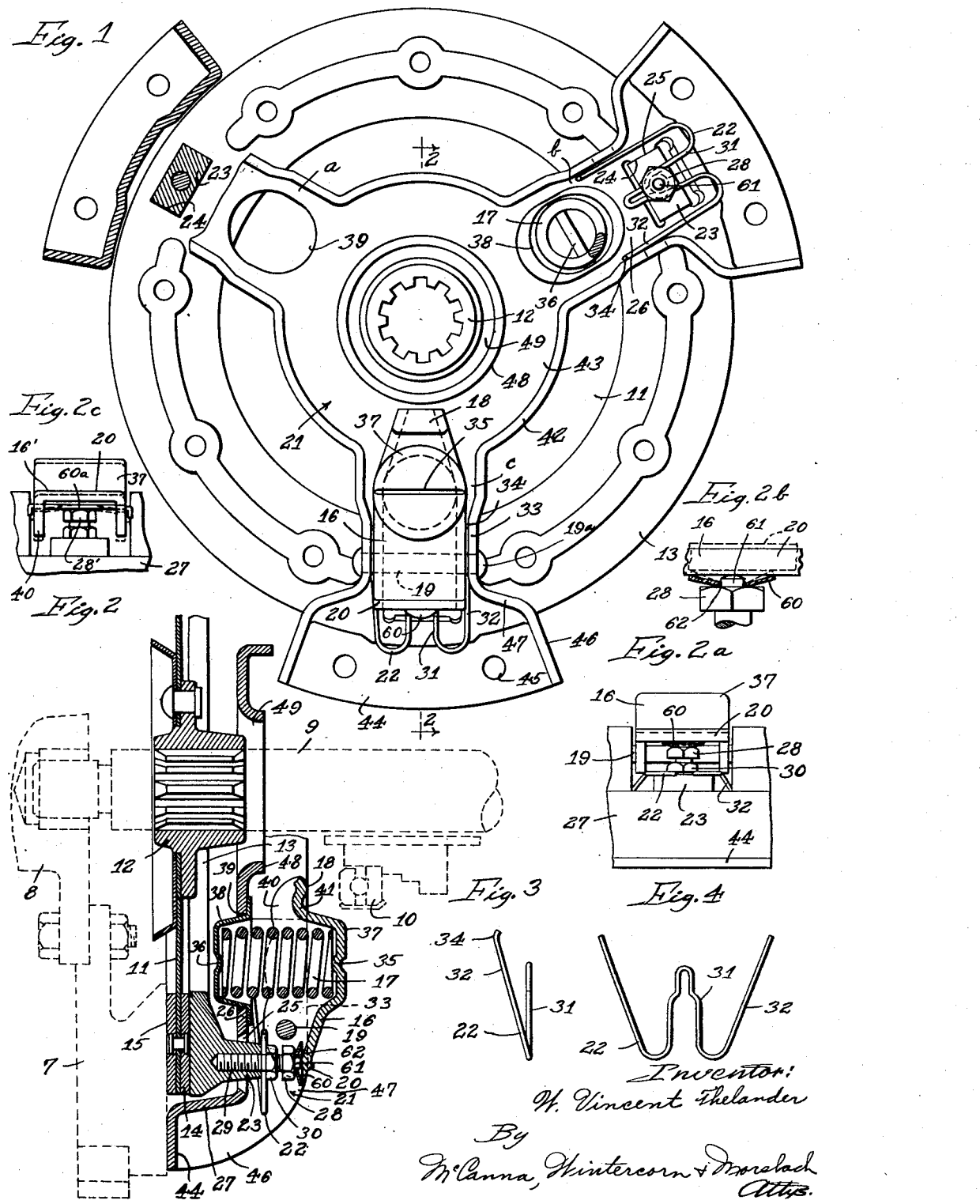

Sept. 17, 1940.  W. V. THELANDER  2,214,780
FRICTION CLUTCH
Filed Oct. 24, 1938  2 Sheets-Sheet 2
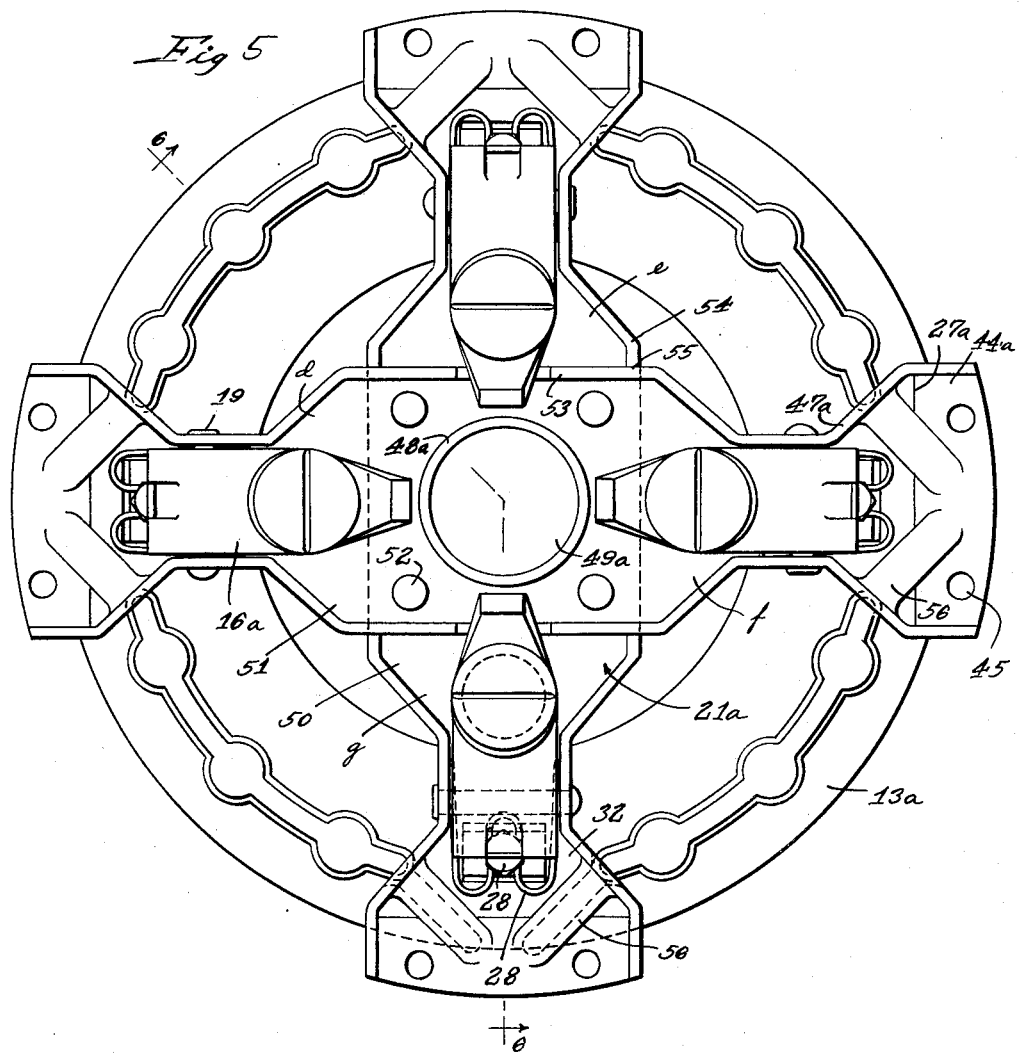
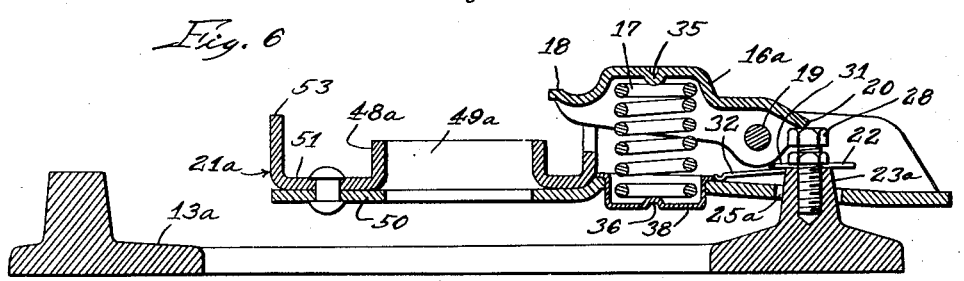
Inventor:
W. Vincent Thelander
By
McCanna, Wintercorn & Morsbach
Attys.

Patented Sept. 17, 1940

2,214,780

UNITED STATES PATENT OFFICE 2,214,780

FRICTION CLUTCH

W. Vincent Thelander, Rockford, Ill.

Application October 24, 1938, Serial No. 236,607

30 Claims. (Cl. 192—68)

This invention relates to friction clutches for use on automobiles, tractors and industrial applications, and is more particularly concerned with improvements in the type of clutch disclosed in Patent No. 1,985,301, issued December 25, 1934, to Carl A. Thelander and myself, in which, by virtue of the use of novel spring pressed release levers, the back plate has been either eliminated or reduced to spider form, exposing the pressure plate for cooler operation and longer life.

In the clutch disclosed in the patent referred to, the levers operated by the throw-out collar to engage and disengage the clutch are pivotally mounted so that the engaging springs have a certain mechanical advantage to obtain multiplied engaging pressure, but there is nevertheless a mechanical advantage derived in the disengaging operation of said levers by the throw-out collar so that the clutch can be disengaged with light pedal pressure. A clutch of that type presents special problems in its practical applications for which it is the principal object of my present invention to provide solutions by improvements in design and construction.

One object is to provide a clutch of the type mentioned having novel spring means acting between the pressure plate and back spider to prevent rattling of the pressure plate by vibration against the spider when the clutch is disengaged, the same spring means serving to move the pressure plate to retracted position for quick disengagement, and serving also to make the clutch easier to handle in shipping, by tying the pressure plate to the spider.

Another important object of my invention is to provide a clutch in which the clutch plate is of plain non-yielding construction on the mat portion, that is, without the usual mutilation providing resilient mat supporting tongues for a so-called "mush" effect designed to prevent grabbing and give gradual engagement, such constructions having been found objectionable for various reasons, the clutch of my invention embodying cushioning means between the pressure plate and the release levers, thereby obtaining smoother engagement with a much simpler and more economical construction, at the same time avoiding the objectionable features of the old construction.

The invention is illustrated in the accompanying drawings, in which—

Fig. 1 is a rear view of a clutch embodying my invention, showing one of the release levers removed and with its cooperating spring broken away to better illustrate the construction, and showing also a portion of the supporting frame broken away and the associated drive lug on the pressure plate in section to further better illustrate the construction;

Fig. 2 is a section on the line 2—2 of Fig. 1, indicating a portion of the flywheel and driven shaft in dotted lines;

Fig. 2a is a fragmentary view of the clutch looking at the outer end of one of the release levers;

Fig. 2b is a fragmentary enlarged view, partly in section, corresponding to a portion of Fig. 2a and indicating in dotted lines, the relationship of the parts when the clutch is disengaged;

Fig. 2c is another fragmentary view similar to Fig. 2a but showing a different type cushioning spring;

Figs. 3 and 4 are, respectively, a side view and back view of the pressure plate retracting spring;

Fig. 5 is a rear view of another larger sized clutch embodying my invention, and Fig. 6 is a section on the broken line 6—6 of Fig. 5.

Similar reference numerals are applied to corresponding parts throughout the views.

Referring first to Figs. 1 to 4, the reference numeral 7 is applied to a flywheel mounted on the rear end of an engine crankshaft 8 so as to form the driving element. A shaft 9 constituting the driven element extends rearwardly from the clutch into the gear box of the transmission in the usual way. At 10 is indicated a portion of the clutch throw-out bearing movable in the usual way by means of the clutch pedal (not shown). The clutch comprises a disk 11 carried on a hub 12 splined on the front end of the shaft 9, and a pressure plate 13 disposed behind and in concentric relation with the matted portion 14 of the disk 11 to cause engagement thereof with the flat face 15 on the flywheel. In accordance with the disclosure in my Patent No. 1,985,301, a plurality of release levers 16 are provided which are arranged to be depressed against the action of compression springs 17 by clutch pedal operation of the throw-out bearing 10 against the inner ends 18 of the levers to disengage the clutch. These levers are pivoted on cross-pins 19 near their outer ends 20 to transmit pressure of the springs 17 in a multiplied degree to the pressure plate 13. In other words, while the pressure of the springs is multiplied through the levers 16 for clutch engagement, it is nevertheless clear that there is an appreciable mechanical advantage also in the disengagement of the clutch by reason of the fact that the springs 17 are closer to the pivots 19 than the inner ends of the levers 18 where the throw-out bearing 10 engages. This mechanical advantage accordingly makes for lighter pedal action. There is another advantage in this location of the springs 17 with respect to the pivots 19 from the standpoint that there is very little loss of spring pressure when the clutch facings or mats 14 become worn, because there is so little expansion of the springs permitted in proportion to a given amount of wear of the facings.

When the levers are depressed and the springs 17 are accordingly compressed between the levers 16 and the back plate or spider 21, the pressure plate 13 in accordance with one important feature of the present invention is arranged to be backed away from the flywheel 7 by springs 22 acting between the back plate 21 and drive lugs 23 on the pressure plate, so that there is no longer any transmission of drive to the disk 11. The lugs 23 project rearwardly from the plate parallel to the axis of rotation and have flat side faces 24 parallel to one another and to radii of said plate slidably engaging the opposite sides of slots 25 provided in the vertical back wall 26 of the back plate 21 to transmit drive through the back plate 21 and pressure plate 13 to the disk 11. By having the lugs 23 parallel to the axis of rotation instead of projecting radially outwardly from the pressure plate, I have found that there is less distortion of the pressure plate because the pressure application is within the area of the pressure plate and clutch disk facings. Furthermore, this arrangement makes for economy in production, because there is less machining costs involved on the rearwardly projecting lugs than on radial lugs and also less machining costs involved in slotting the back wall 26 as compared with slotting the peripheral wall 27 of the back plate.

The lugs 23 have set screws 28 threaded in longitudinal holes 29 provided therein, and when the heads of the screws 28 are properly adjusted with relation to the outer ends 20 of the levers 16, lock nuts 30 on the shanks of the screws 28 are tightened against the rear ends of the lugs 23 to lock the screws in adjusted position. To take up for wear on the facings 14, the screws 28 can be backed up a turn or so after the lock nuts 30 are loosened, and when the correct relationship of the clutch parts is reproduced in that way, the screws 28 are locked in adjusted position by tightening the nuts 30. The nuts 30, in accordance with the present invention, serve to clamp the springs 22 by their middle U-shaped attaching portion 31. These springs are hairpin shaped so as to provide the U-shaped attaching portion 31 to straddle the shank of the screw 28 under the lock nut 30 but have the two legs 32 bent outwardly and forwardly into a plane at an acute angle with respect to the plane of the attaching portion 31. In that way, the legs 32 which normally are disposed at an angle of approximately 45° with respect to one another, as shown in Fig. 4, but are adapted to be forced toward one another between the parallel rearwardly bent flanges 33 on the back plate, as shown in Fig. 1, have lateral components and forward components as these legs tend to spread and move forward from the cramped operative position in which they are shown in Figs. 1 and 2. The lateral component resulting from the crowding of the legs 32 against the flanges 33 keeps the lug 23 associated with each spring centralized with respect to its associated slot 25 in the back plate when the clutch is released, thereby preventing or minimizing the danger of rattling. The forward component due to the rearward deflection of the arms 32 when the pressure plate 13 is moved forward under spring action of the levers 16 to engage the clutch, asserts itself when the clutch is released and causes the pressure plate 13 to back away from the flywheel and clutch disk as the outer ends 20 of the levers 16 are retracted in relation to the screws 28. The extremities of the legs 32 are slightly curled, as indicated at 34 in Fig. 3, to slide freely on the back of the wall 26 of the back plate and along the inside of the flanges 33.

The springs 22 also serve a third purpose; in the shipment of the clutch, they keep the pressure plate 13 in assembled relation to the back plate. Thus, there is a unitary assembly which is handy for shipment and facilitates assembling on the engine flywheel at the automobile plant.

Each of the coiled compression springs 17, in accordance with the present invention, bears at opposite ends on the rounded ridges of diametrically extending ribs 35 and 36 provided in the bottoms of the rearwardly protruding boss 37 formed on the lever 16 and a stamped sheet metal cup 38 set in a hole 39 in the back plate. These ribs, it will be noticed, are parallel to the pivot pin 19. I have found that this construction is of advantage over a construction where flat seats are provided at these points, because it maintains constant the point of spring pressure application in relation to the pivot point 19 of the lever 16, and the end coils of the spring remain in approximate parallelism, and there is no bowing outwardly of the intermediate coils with consequent loss of spring pressure. Each of the levers 16 is a sheet metal stamping of elongated form generally channel-shaped in cross-section whereby to provide longitudinal reenforcing flanges to lend stiffness and durability. The boss 37 is formed in the web portion 41, and the ends 18 and 20 are formed by punching the web portions 41 in opposite directions so as to present rounded faces for engagement with the throw-out collar bearing 10 and set screw 28, respectively. The pivot pin 19 extends through alined holes in the flanges 40. The levers 16 are arranged to have the flanges 40 strike the back wall 26 of the back plate to limit travel and thus avoid closing the coiled compression springs 17 to a point where breakage might occur.

I have previously referred to the flanges 33 in discussing the springs 22, and I desire now to point out that these flanges are intermediate portions of continuous marginal flanges providing arcuate portions 42 defining the periphery of a circular central portion 43 interconnecting the three radial branches a, b, and c of the spider-like back plate, on each of which one of the release levers 16 is pivotally mounted and operatively associated with a drive lug 23 on the pressure plate 13. The outer ends of the branches a, b, and c of the back plate 21 are formed to provide front walls 44 in forwardly spaced relation to the back wall 26, and perforated, as at 45, to receive bolts or screws for fastening the back plate to the flywheel 7 against the back of which the walls 44 engage, as indicated in Fig. 2. There are radially extending flanges 46 formed on the lateral edges of the walls 44 which are connected with the flanges 33 by flanges 47 formed on the edges of the intermediate peripheral walls 27 of the back plate. A circular flange 48 concentric with the arcuate flanges 42 defines a center hole 49 in the back plate through which the shaft 9 extends. The reenforcing flanges 33, 42, and 46—46 all serve to reenforce the back plate and make it feasible to provide such a spider-like back plate with so much of the pressure plate exposed, and it is well known that the cooler the pressure plate is kept the less wear there is on the facings 14. In so far as the flanges 33 are concerned, at which point special attention is called to the extent to which the present design involves narrowing down the branches a, b, and c of the back plate for better exposure of the pressure plate and consequently cooler performance, it is clear that these flanges provide support for the ends of the pivot pins 19 which are entered through holes in the flanges and have their projecting ends upset as at 19a. The pivot pin deflection is cut down to a minimum with this back plate construction and consequently much quicker clutch action is obtained.

Attention is now called to the fact that the clutch disk 11 has the mats or facings 14 riveted to the unmutilated marginal edge portion thereof, instead of providing spring tongues struck from the plane of the disk and having the mats or facings secured thereto with a view to obtaining what is commonly called a "mush" effect. The mush effect in most instances permitted the facings to be squeezed together .040" to .050" in the engagement of the clutch, and it has been difficult to produce clutch plates with that amount of yield in the facings and still keep the facings parallel to one another. In fact, there has often been as much as .040 "run out" found in an indicator reading taken on the rear facing when the plate is rotated. Then, too, the spring tongues required for the mush effect were objectionable because the facings would not come into full engagement with the flywheel and pressure plate and wear would be taken only at a number of circumferentially spaced spots. Manufacturers have recognized that difficulty and realized that the wearing away of the facings at only a number of isolated spots meant quicker wear and consequently shorter life for the plate and also more slippage which in turn accelerates wear, and these manufacturers have accordingly sought to increase the number of points of contact by using a greater number of spring sectors on the plate. In accordance with the present invention, I have found that I can eliminate the mush effect entirely and nevertheless obtain the desired gradual engagement of the clutch by providing resilient cushioning means between the pressure plate 13 and the release levers 16. Thus I have shown concavo-convex spring washers 60 mounted on the heads of the set screws 28 under the outer ends 20 of the levers 16 in any suitable or preferred manner. Bosses 61 provided on the heads of the screws enter center holes 62 in the spring washers to mount the same on the screws. These bosses take the direct positive thrust of the levers 16 at full engagement of the clutch, as best appears in Fig. 2b, that is, after the washers 60 have been compressed during initial engagement. The dotted lines serve to indicate the relationship of the parts prior to compression of the washer. With this construction it is obvious that the washers are protected against too severe compression and I am enabled to apply full engaging pressure and avoid slippage. The outer ends 20 of the levers 16 are wide enough to engage the rims of the washers on the concave side at diametrically opposite points, as shown in Figs. 2a and 2b. With this construction, the pressure plate is free to float into full engagement with the clutch disk, because the pressure plate has an opportunity, due to the resilience of the washers 60 under the three levers 16, to be perfectly aligned with the rear facing on the clutch disk before full engaging pressure is applied. This light initial pressure applied as the pressure plate floats into engagement obviously permits very smooth power take-up before full engaging pressure is applied to pull the full load. It should be clear that this type of cushioning means can very easily be controlled within definite limits, and in quantity production of clutches will not present anywhere near the difficulties involved in the production of clutch disks with built-in mush effect. There is manifestly an appreciable saving in the cost of production of plain faced disks over disks of the mush type. Last but not least, with the present construction I avoid entirely the old problem of having the facings on the clutch disk wearing at only a number of circumferentially spaced spots. In passing, I would add that while spring washers are shown for the cushioning means, I do not limit myself to that, inasmuch as any equivalent resilient means may be employed.

Referring to Fig. 2c, 60a is a spring wire mounted at its ends in holes in the flanges 40 of the release lever 16' in transverse relation to the head of the set-screw 28' and adapted to be bowed as indicated in dotted lines, when the lever exerts clutch engaging pressure on the screw, the wire being ultimately solidly engaged between the lever and bolt when there is full engagement of the clutch. Such spring cushioning means will therefore give about the same results as the spring washers 60 above described.

In Figs. 5 and 6, a two-piece back plate 21a is shown providing a four-legged spider construction with branches d, e, f, and g, on each of which a release lever 16a is carried and operatively associated with a drive lug 23a on the pressure plate 13a. Two sheet metal stampings 50 and 51 are provided in crisscross relation and riveted together, as at 52, to form the back plate 21a. There are continuous longitudinal flanges 53 along the side edges of the stamping 51 and similar flanges 54 along the side edges of the stamping 50, which, however, are cut away at 55 to receive the stamping 51. The stamping 51 has a circular flange 48a defining the central opening 49a through which the driven shaft corresponding to the shaft 9 of the other clutch is adapted to extend. The two stampings riveted together and flanged, as shown, provide adequate strength and rigidity for a larger sized back plate required in larger clutches. Diagonally extending hollow reenforcing ribs 56 are provided on the outer ends of the stampings 50 and 51 to transmit torque loads from the flywheel to the pressure plate with minimum torsional deflection in the branches d—g of the back plate, it being seen that these ribs extend from the front attaching walls 44a at points adjacent the bolt holes 45 across the intermediate peripheral walls 27a to the flanges 41a adjacent the points where the drive lugs 23a extend through the slots 25a in the back plate. Generally speaking, a clutch of this construction will operate in the same manner and offer the same advantages as a clutch constructed along the lines disclosed in Figs. 1 and 2. Washers 60 are omitted in this construction, but may be added in the same way as shown in Figs. 1, 2 and 2a.

It is believed the foregoing description conveys a good understanding of the objects and advantages of my invention. The appended claims have been drawn with a view to covering all legitimate modifications and adaptations.

I claim:

1. In a clutch comprising a driving element and a driven element, a pressure plate for holding the driving and driven elements frictionally engaged, a lever support, a lever thereon arranged to communicate movement to the pressure plate under spring pressure to cause engagement of the clutch, spring means active against the lever to apply clutch engaging pressure to the pressure plate, said pressure plate having a projection extending rearwardly through an opening provided therefor in the lever support toward the lever for operation of the pressure plate by the lever and to provide a driving connection between the pressure plate and said support, one end of said lever being disposed in operative relation to said projection and the other end of said lever being manually operable to release the clutch, and a spring carried on and projecting laterally and forwardly from said projection and acting between the lever support and the aforesaid projection for retracting the pressure plate.

2. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, release levers pivotally supported near their outer ends on said supporting means so that their outer ends are disposed for engagement with said lugs to transmit pressure to the pressure plate, screws on said lugs adjustable toward and away from the outer ends of said levers to change the operative relationship between the levers and pressure plate, springs supported on the lever supporting means and engaging said levers between the pivots therefor and their inner ends, said levers being operable manually at their inner ends to release the spring pressure from the pressure plate, lock nuts on the aforesaid screws adapted to be tightened toward the ends of the lugs, and other springs arranged to be clamped between the lock nuts and the ends of said lugs in engagement with the lever supporting means to retract the pressure plate relative to the flywheel.

3. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, said lever supporting means providing laterally spaced supporting walls on opposite sides of each of said drive lugs, a release lever pivotally supported near its outer end between said walls adjacent each of said lugs with the outer end disposed in operative relation to the lug to transmit pressure to the pressure plate, springs supported on said lever supporting means and engaging said levers between the pivots therefor and their inner ends, said levers being operable manually at their inner ends to release spring pressure from the pressure plate, and hairpin springs carried on said drive lugs by their bight portions and having the legs thereof spread laterally and forwardly into engagement with the walls on the lever supporting means substantially as and for the purpose described.

4. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, a back plate mounted on the flywheel and having openings provided therein in which said drive lugs are slidably engaged whereby to transmit drive from the flywheel to the pressure plate while permitting movement of the latter toward and away from the flywheel, release levers pivotally supported near their outer ends on said back plate so that their outer ends are disposed in operative relation with the rear ends of said lugs to transmit pressure to the pressure plate, retracting springs mounted on said lugs and engaging the back plate tending normally to disengage the clutch, and other springs acting between the back plate and the levers between the pivots therefor and their inner ends normally tending to cause engagement of the clutch, said levers being operable manually at their inner ends to release the spring pressure from said pressure plate.

5. A friction clutch as set forth in claim 4 including adjusting screws threaded in the rear ends of said lugs for adjustment toward and away from the outer ends of said levers to change the operative relationship between the pressure plate and said levers, said screws supporting the first named springs, and lock nuts on said screws arranged to be tightened against the rear ends of said lugs.

6. A friction clutch as set forth in claim 4 including adjusting screws threaded in the rear ends of said lugs for adjustment toward and away from the outer ends of said levers to change the operative relationship between the pressure plate and said levers, the first named springs being hairpin shaped and having the bight portions thereof straddling said screws while the legs thereof have engagement with the back plate, and lock nuts on said screws serving to clamp the bight portions of said springs on the rear ends of said lugs.

7. A clutch assembly adapted to be assembled on a flywheel in operative relation to a clutch disk, said assembly comprising a pressure plate adapted to hold the clutch disk frictionally engaged with the flywheel, said plate having a plurality of circumferentially spaced drive lugs projecting rearwardly therefrom, a back plate adapted to be mounted on the flywheel and having a plurality of circumferentially spaced openings provided therein slidably receiving said lugs, springs secured to the projecting portions of said lugs behind said back plate and engaging said back plate to prevent disengagement of said drive lugs from the openings in said back plate prior to assembly of the back plate on the flywheel, said springs being adapted thereafter to serve to retract the pressure plate relative to the flywheel upon disengagement of the clutch, release levers pivotally supported near their outer ends on said back plate with their outer ends disposed in operative relation to said lugs to transmit pressure to the pressure plate, and springs acting between said back plate and said levers to apply spring pressure to the pressure plate.

8. An assembly as set forth in claim 7 wherein the first named springs provide spring arms each of which is so disposed with respect to the drive lug associated therewith and the back plate to provide a rearward component tending to retract the pressure plate toward the back plate, and a lateral component urging the drive lug laterally toward one side of the associated opening in the back plate.

9. An assembly as set forth in claim 7 wherein each of the first named springs provide a pair of opposed spring arms so disposed with respect to the associated drive lug and back plate to provide a rearward component tending to retract the pressure plate toward the back plate, and opposing lateral components tending to keep the drive lug in floating relation to opposite sides of the associated opening in the back plate when the clutch is disengaged.

10. In a friction clutch comprising a driving element and a driven element, a pressure plate for holding said elements frictionally engaged, a plurality of levers for communicating movement to the pressure plate under spring pressure to cause engagement of the clutch, a plurality of coiled compression springs equal in number to the levers and each active against one of said levers to apply pressure to the pressure plate, means for supporting said levers and springs on the driving element providing a pivot for each lever near the outer end thereof, and a seat for the associated spring cooperating with the lever locating the spring between the pivot and the inner end of the lever, the outer end of the lever being active on the pressure plate and the inner end being manually operable, each seat including a transverse abutment extending diametrically with respect to the adjacent circular end of the spring substantially parallel with the axis of the pivot for said lever and spacing the end of said spring from the rest of the seat for the purpose described.

11. In a friction clutch comprising a driving element and a driven element, a pressure plate for holding said elements frictionally engaged, a plurality of levers for communicating movement to the pressure plate under spring pressure to cause engagement of the clutch, a transverse pivot for each of said levers near the outer end thereof, the outer end of said lever being disposed in operative relation to the pressure plate and the inner end being manually operable, a coiled compression spring associated with each of said levers and engaging the same between their pivots and their inner ends, means for supporting the other ends of said springs, and a seat on each of said levers for abutment with the adjacent circular end of the associated spring including a transverse abutment extending diametrically with respect to the adjacent circular end of the spring substantially parallel with the axis of the pivot for said lever and spacing the end of said spring from the rest of the seat for the purpose described.

12. In a clutch comprising a driving element and a driven element, a pressure plate for holding the driving and driven elements frictionally engaged, a plurality of levers for communicating movement to the pressure plate under spring pressure whereby to cause engagement of the clutch, a support and a transverse pivot thereon for each of said levers near the outer end therefor, the outer end of said lever being active on the pressure plate and the inner end being manually operable, a coiled compression spring active against each lever between the pivot and the inner end, and means providing seats for the opposite ends of each spring one on the lever and the other on the support with respect to which said lever is movable, each of said seats including a transverse abutment extending diametrically with respect to the adjacent circular end of the spring substantially parallel with the axis of the pivot for said lever and spacing the end of said spring from the rest of the seat for the purpose described.

13. In a friction clutch comprising a flywheel serving as a driving element and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, release levers pivotally supported near their outer ends on said lever supporting means so that their outer ends are disposed in operative relation to the rear ends of said lugs to transmit pressure to the pressure plate, resilient cushion means carried on said lugs compressible between the outer ends of said levers and the rear ends of said lugs in the transmission of pressure to the pressure plate by the levers, and spring means active against said levers between the pivots therefor and their inner ends to cause engagement of the clutch, said levers being operable manually at their inner ends whereby to release the spring pressure from said pressure plate.

14. A friction clutch as set forth in claim 13, including adjusting screws for changing the operative relationship between said lugs and the outer ends of said levers, said screws serving to support said resilient means.

15. In a friction clutch comprising a flywheel serving as a driving element and a clutch disk serving as a driven element, a circular pressure plate for holding the marginal portion of the clutch disk frictionally engaged with the flywheel, a one-piece sheet metal back plate comprising a central portion of small radius in relation to the radius of the pressure plate, and a plurality of integral radial branch portions in equally circumferentially spaced relation radiating from the central portion and having means at their outer ends for mounting the same on the flywheel, whereby the major portion of the circumference of the pressure plate is left exposed between said branch portions of said back plate, said pressure plate having a plurality of equally circumferentially spaced drive lugs projecting therefrom and slidably received in openings provided therefor in the branch portions of the back plate, each of said branch portions having on the opposite side edges thereof rearwardly directed reenforcing flanges in substantially parallel relation, and a plurality of spring actuated levers for transmitting pressure to the pressure plate pivotally mounted one on each branch portion of the back plate between the reenforcing flanges thereof with a pivot pin extending through said flanges.

16. A friction clutch as set forth in claim 15 wherein the marginal edges of the central portion of the back plate have rearwardly directed flanges integral therewith and joined at their ends to the inner ends of the reenforcing flanges on said branch portions.

17. In a friction clutch comprising a flywheel serving as a driving element and a clutch disk serving as a driven element, a circular pressure plate for holding the marginal portion of the clutch disk frictionally engaged with the flywheel, a skeleton form of back plate formed by two transversely arranged sheet metal cross-members extending diametrically with respect to the pressure plate and secured together by their overlapped intermediate portions, each of said members having the outer ends thereof provided with means for mounting the same on the flywheel, the overlapped portions of said members being small in relation to the radius of said pressure plate whereby the major portion of the pressure plate is left exposed between said members, each of said members having on the opposed longitudinal edges thereof rearwardly directed flanges substantially parallel to one another, said pressure plate having a plurality of circumferentially spaced drive lugs projecting therefrom and slidably received in openings provided in said members, and a plurality of spring actuated levers for transmitting pressure to the pressure plate pivotally mounted on two opposite ends of each of said members between the rearwardly directed flanges thereof, each with a pivot pin extending through said flanges.

18. In a friction clutch comprising driving and driven elements, a pressure plate for holding said driving and driven elements frictionally engaged, a plurality of levers supported in circumferentially spaced relation relative to the pressure plate and arranged to apply pressure at a corresponding number of circumferentially spaced points to the pressure plate, said levers being movable in one direction to engage the clutch and in the opposite direction to disengage the same, the levers each being elongated and of channel-shaped cross-section whereby to provide laterally spaced longitudinal flanges projecting toward the pressure plate, adjusting screws on the pressure plate each projecting between the flanges of one of said levers and adapted to vary the operating relationship between the pressure plate and the actuating ends of said levers, and spring wires supported on the flanges of said levers in transverse relation to and adapted to engage the screws to provide a resilient cushioning action in the engagement of the clutch, said wires upon extreme deflection arranged to rest at their intermediate portions against the web portions of the levers, whereby to provide positive engagement of the clutch.

19. As an article of manufacture, a clutch release lever comprising an elongated, generally channel shaped, one-piece sheet metal body providing laterally spaced longitudinal flanges connected by a web portion and perforated in register with one another to receive a pivot pin in transverse relation to the lever intermediate the ends thereof, the one end adapted to transmit pressure to a clutch pressure plate and the other end adapted to be manually operated to release such clutch engaging pressure, said lever having the web portion formed at one point between the pivot holes and the manually operated end of the lever to provide a hollow outwardly projecting substantially cylindrical boss in a plane parallel to and substantially midway between the longitudinal flanges adapted to seat one end of a coiled compression spring for spring actuation of the lever toward engagement of the clutch, said boss having the seat portion in the outer end thereof formed to provide an inwardly projecting ridge extending diametrically with respect to the boss and substantially parallel with the axis of the pivot pin adapted to space the end of the spring from the rest of the seat.

20. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, a back plate mounted on the flywheel and having openings provided therein in which said drive lugs are slidably engaged whereby to transmit drive from the flywheel to the pressure plate while permitting movement of the latter toward and away from the flywheel, release levers pivotally supported near their outer ends on said back plate so that their outer ends are disposed in operative relation with the rear ends of said lugs to transmit pressure to the pressure plate, retracting springs mounted on said lugs and engaging the back plate tending normally to disengage the clutch, said release levers being spring operated in one direction tending normally to cause engagement of the clutch and being operable manually in the opposite direction, resilient cushioning means carried on said lugs compressible between the outer ends of said levers and the rear ends of said lugs in the transmission of pressure to the pressure plate by the levers, and adjusting screws also carried on the lugs for changing the operative relationship between the rear ends of said lugs and the outer ends of said levers.

21. A clutch as set forth in claim 20 including lock nuts on the adjusting screws arranged to be tightened against the rear ends of said lugs and to clamp the retracting springs in operative relation to the lugs.

22. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, a back plate mounted on the flywheel and having openings provided therein in which said drive lugs are slidably engaged whereby to transmit drive from the flywheel to the pressure plate while permitting movement of the latter toward and away from the flywheel, release levers pivotally supported near their outer ends on said back plate so that their outer ends are disposed in operative relation with the rear ends of said lugs to transmit pressure to the pressure plate, said levers being spring operated in one direction tending normally to cause engagement of the clutch and being operable manually in the opposite direction, retracting springs mounted on said lugs and engaging the back of the back plate tending normally to disengage the clutch, and resilient cushioning means carried on the rear ends of said lugs and compressible by the outer ends of said levers in the transmission of pressure to the pressure plate by the levers.

23. In a friction clutch comprising a flywheel as a driving element, and a clutch disk serving as a driven element, a pressure plate for holding the clutch disk frictionally engaged with the flywheel, said plate having a plurality of circumferentially spaced drive lugs projecting rearwardly therefrom, a back plate mounted on the fly wheel and having openings provided therein in which said drive lugs are slidably engaged whereby to transmit drive from the flywheel to the pressure plate while permitting movement of the latter toward and away from the flywheel, release levers pivotally supported near their outer ends on said back plate so that their outer ends are disposed in operative relation with the rear ends of said lugs to transmit pressure to the pressure plate, said levers being spring operated in one direction tending normally to cause engagement of the clutch and being operable manually in the opposite direction, resilient cushioning means carried on said lugs and compressible between the outer ends of said levers and the rear ends of said lugs in the transmission of pressure to the pressure plate by the levers, adjusting screws carried on and projecting from the rear ends of said lugs for changing the operative relationship between the lugs and the outer ends of said levers, and lock nuts on said screws arranged to be tightened against the rear ends of said lugs.

24. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, release levers pivotally supported near their outer ends on said supporting means so that their outer ends are disposed for engagement with said lugs to transmit pressure to the pressure plate, said levers being spring operated in one direction tending normally to cause engagement of the clutch and being operable manually in the opposite direction, screws carried on and projecting rearwardly from said lugs and adjustable to change the operative relationship between said levers and pressure plate, and springs acting between the screws and back of the back plate and tending normally to retract the pressure plate with respect to the flywheel.

25. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, said lever supporting means providing laterally spaced supporting walls on opposite sides of each of said drive lugs, a release lever pivotally supported near its outer end between said walls adjacent each of said lugs with the outer end disposed in operative relation to the lug to transmit pressure to the pressure plate, said levers being spring operated in one direction tending normally to cause engagement of the clutch and being operable manually in the opposite direction, and hair pin springs carried on said lugs by their bight portions with the legs thereof in engagement with the lever supporting means so as to exert a rearward force on the lugs tending to retract the pressure plate to disengaged position, said springs also exerting a lateral force on said lugs to prevent rattling engagement of the lugs with the lever supporting means during disengagement of the clutch.

26. A clutch as set forth in claim 25 including adjusting screws on the lugs adjustable toward and away from the outer ends of the levers to change the operative relationship between the pressure plate and said levers, the hairpin springs having the bight portions thereof straddling the shanks of said screws, and lock nuts on said screws which when tightened clamp the bight portions of said springs on the ends of said lugs while securing the screws in adjusted position.

27. In a friction clutch comprising a flywheel serving as a driving element, and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel having openings provided therein through which said lugs project rearwardly for sliding driving engagement with said means, said lever supporting means having laterally spaced supporting walls disposed on opposite sides of each of said drive lugs, a release lever pivotally supported between said walls disposed on opposite sides of each of said drive lugs, a release lever pivotally supported between said walls and arranged to transmit pressure to the pressure plate by engagement with the lugs, said levers being spring operated in one direction toward engagement of the clutch and being operable manually in the opposite direction, and hair pin springs carried on said drive lugs by their bight portions, each having one leg thereof projecting forwardly for engagement with the lever supporting means to exert a retracting force on the lugs tending to move the pressure plate away from the flywheel, the other leg of each spring projecting laterally and engaging the adjacent lever supporting wall on the lever supporting means so as to exert a lateral force on the lugs to minimize rattling engagement of the lugs in the openings in the lever supporting means during disengagement of the clutch.

28. As an article of manufacture, a coiled spring seat member for engagement with one end of a coiled compression spring, the other end of which exerts pressure against a clutch release lever, said seat member comprising a one-piece sheet metal generally cylindrical cup having an outwardly flanged rim portion for supporting engagement with a back plate on a clutch when the cup is inserted in an opening provided therefor in said plate, said cup having a circular bottom wall formed to provide an embossed transverse abutment extending diametrically with respect to said bottom and adapted to have engagement diametrically with the circular end of the spring so as to space the end of the spring from the rest of the seat member for the purpose described.

29. In a friction clutch comprising a flywheel serving as a driving element and a clutch disk serving as a driven element, a pressure plate for holding the clutch disk frictionally engaged with the flywheel, said plate having a plurality of circumferentially spaced drive lugs projecting rearwardly therefrom, lever supporting means mounted on the flywheel and slidably engaged by said lugs whereby to transmit drive from the flywheel to the pressure plate while permitting movement of the latter toward and away from the flywheel, release levers pivotally mounted on said lever supporting means in operative relation to the rear ends of said lugs to transmit pressure to the pressure plate, spring means cooperating with said lugs and the lever supporting means tending normally to move the pressure plate to retracted position, and resilient cushioning means carried on said levers and compressible between the levers and the rear ends of said lugs in the transmission of pressure to the pressure plate by the levers.

30. In a friction clutch comprising driving and driven elements, a pressure plate for holding said driving and driven elements frictionally engaged, a plurality of levers supported in circumferentially spaced relation relative to the pressure plate and arranged to apply pressure at a corresponding number of circumferentially spaced points to the pressure plate, said levers being movable in one direction to engage the clutch and in the opposite direction to disengage the same, the levers each being elongated and of channel-shaped cross-section whereby to provide laterally spaced longitudinal flanges projecting toward the pressure plate, adjusting screws on the pressure plate each projecting between the flanges of one of said levers and adapted to vary the operating relationship between the pressure plate and the actuating ends of said levers, and members yieldably supported on the flanges of said levers in transverse relation to and adapted to engage the screws to provide a resilient cushioning action in the transmission of pressure to the pressure plate by the levers.

W. VINCENT THELANDER.